(12) United States Patent
Edelen (10) Patent No.: US 8,285,799 B2
(45) Date of Patent: Oct. 9, 2012

(54) QUOTA-BASED ARCHIVING

(75) Inventor: James Edelen, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 12/766,026

(22) Filed: Apr. 23, 2010

(65) Prior Publication Data

US 2011/0264630 A1    Oct. 27, 2011

(51) Int. Cl.
*G06F 15/16*    (2006.01)
*G06F 17/00*    (2006.01)
*G06F 9/44*    (2006.01)

(52) U.S. Cl. ........ 709/206; 709/202; 707/661; 707/665; 719/313

(58) Field of Classification Search .................. 709/202, 709/206
See application file for complete search history.

(56) References Cited

U.S. PATENT DOCUMENTS

| | | | |
|---|---|---|---|
| 7,624,151 B2 | 11/2009 | Heidloff | |
| 2002/0147733 A1 | 10/2002 | Gold | |
| 2003/0065724 A1 | 4/2003 | Clark | |
| 2008/0109820 A1 | 5/2008 | Raghunandan | |
| 2009/0304362 A1 | 12/2009 | Neufeld | |

OTHER PUBLICATIONS

Archive Attender for Microsoft Exchange Server by Sherpa Software; accessed at: http://www.itfts.com/vendor/sherpa/sherpa%20archive%20attender%20microsoft%20exhange.html; accessed on Feb. 24, 2010, 4 pages.
Email Archiving Software Features—The Archiving Process; published Sep. 23, 2008, 12 pages.
HP Email Archiving Software for Lotus Domino 2.0; published Jan. 23, 2009, 7 pages.
Quota Based Archiving—How It Works and Why You May Wrongly Believe It Does Not!!! Dec. 21, 2009, 3 pages.
Shortcut Estimates for Quota-based Archiving; accessed at: http://66.102.9.132/search?q=cache:tlBnO88_PxIJ:ftp://exftpp.symantec.com/pub/support/products/Exhange_Mailbox_Archiving_Unit/313276.pdf+quota-based+archiving&cd=7&hl=en&ct=clnk; accessed on Feb. 24, 2010, 6 pages.
Symantec Enterprise Vault: Administrator's Guide, updated Jun. 7, 2009, 370 pages.
Symantec Enterprise Vault: Setting up Exchange Server Archiving; Copyright 2008, 228 pages.
Symantec Enterprise Vault™, Store, Manage, and Discover Critical Business Information; Copyright 2008, 6 pages.

*Primary Examiner* — Wing Chan
*Assistant Examiner* — David X Yi
(74) *Attorney, Agent, or Firm* — Merchant & Gould (57) ABSTRACT

A determination of whether to archive email messages in a user mailbox is made each time an email message is received at a server computer. A storage quota, a first threshold and a second threshold are obtained for the user mailbox. The first threshold is a first percentage of the storage quota. The second threshold is a second percentage of the storage quota. When it is determined that the size of the received email message plus the current size of the user mailbox exceeds the first threshold for the user mailbox, one or more email messages in the user mailbox are archived. The archiving of the one or more email messages reduces the current size of the user mailbox such that the current size of the user mailbox becomes less than the number of bytes corresponding to the second threshold for the user mailbox.

17 Claims, 7 Drawing Sheets

QUOTA-BASED ARCHIVING

BACKGROUND

Email systems are commonly comprised of a large number of mailbox servers, each containing a large number of user mailboxes. Each user mailbox typically has a size quota limiting the number and/or size of the emails that can be stored in the user mailbox. Archiving systems are commonly used to periodically transfer email messages from user mailboxes to archived storage in order to keep the size of the user mailboxes below the size quota.

Archiving of emails is commonly initiated at set intervals, such as daily, weekly, or monthly. Older messages are typically archived before newer messages. Email users often need to spend time managing their user mailboxes in order to prevent email messages they need from being archived.

SUMMARY

Embodiments of the disclosure are directed to a method for archiving email messages on a server computer. An email message is received at the server computer. A user mailbox to which the email message is to be directed is determined. A storage quota is obtained for the user mailbox. A first threshold is obtained for the user mailbox. The first threshold is a first percentage of the storage quota. A second threshold is obtained for the user mailbox. The second threshold is a second percentage of the storage quota. The second threshold is lower than the first threshold. A current size of the user mailbox is obtained. The current size comprises the size in bytes of all email messages and attachments to email messages currently in the user mailbox. A size of the received email message is determined. A determination is made as to whether the size of the received email message plus the current size of the user mailbox exceeds the first threshold for the user mailbox. When it is determined that the size of the received email message plus the current size of the user mailbox exceeds the first threshold for the user mailbox, one or more email messages in the user mailbox are archived. The archiving of the one or more email messages reduces the current size of the user mailbox such that the current size of the user mailbox becomes less than the number of bytes corresponding to the second threshold for the user mailbox. A determination of whether to archive one or more email messages in the user mailbox is made each time an email message is received at the server computer.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for archiving email messages on a server computer. A determination of whether to archive is based on storage quotas for user mailboxes on the server computer.

The server computer is a mailbox server that includes many user mailboxes. Each user mailbox is assigned a storage quota, specifying a limit in bytes for email messages and attachments stored in each user mailbox.

In some examples described herein, each user mailbox is also assigned a first threshold value and a second threshold value. The first threshold value is a percentage of the storage quota that constitutes a high watermark for mailbox storage. The second threshold is a percentage of the storage quota that constitutes a low watermark for mailbox storage.

In this example, when an email message is received at the mailbox server for a particular user, a determination is made as to whether the size of the email message plus any attachments to the email message when added to the current size of the user's mailbox is greater than the high watermark. When it is determined that the size of the email message plus any attachments to the email message plus the current size of the user mailbox is equal to or lower than the high watermark, the received email message is sent to the user mailbox. However, when it is determined that the size of the received email message plus any attachments plus the current size of the email message is greater than the high watermark, one or more email messages stored in the user mailbox are archived until the current size of the user mailbox becomes less than the low watermark.

The term "archiving" as used in this disclosure refers to transferring one or more items stored in a user's mailbox on mailbox server to one or more storage devices external to the user's mailbox, such as storage on a separate server. Items stored in a user's mailbox include one or more email messages, calendar items, voice mails, SMS (short message service) messages or similar mailbox items. Archiving email messages, using the systems and methods in the present disclosure, allows email messages sent to a user mailbox to automatically be received, rather than being rejected due to storage limitations.

Figure 1:
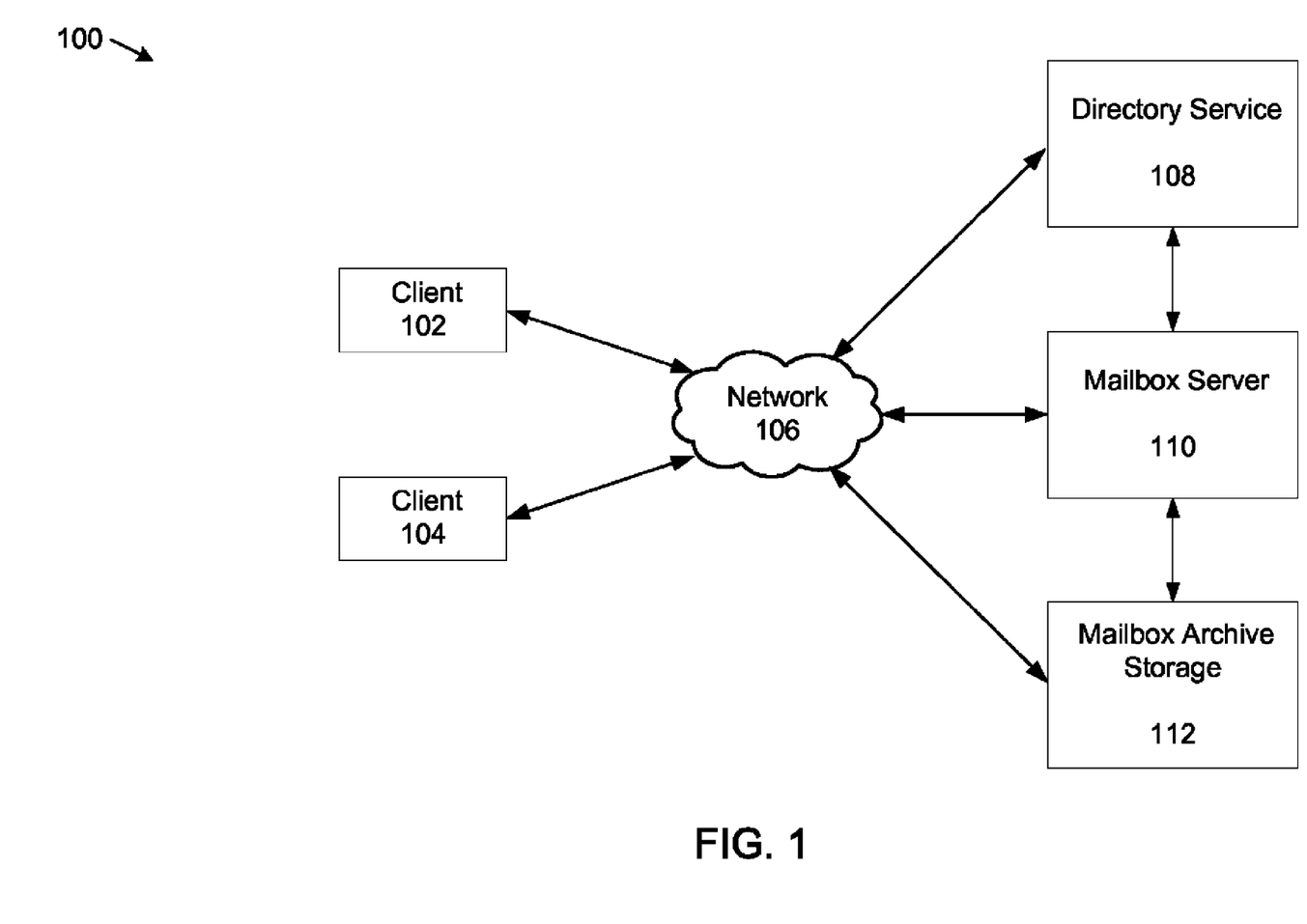
FIG. 1 shows an example system that supports quota-based archiving.

FIG. 1 shows an example system 100 that can be used to archive email messages on a server computer. The example system 100 includes client computers 102, 104, network 106, directory service 108, mailbox server 110 and mailbox archive storage 112.

Client computers 102, 104 include software, such as Microsoft OUTLOOK® 2007 messaging and collaboration software from Microsoft Corporation of Redmond, Wash., that includes functionality for sending and receiving email messages at client computers 102, 104.

Directory service 108 is a directory of user objects, including user mailboxes. The directory service 108 associates a user name and email address with a user mailbox. An example of a directory service 108 is the ACTIVE DIRECTORY® directory service from Microsoft Corporation of Redmond, Wash.

Mailbox server 110 is part of a server-based email system such as Microsoft Exchange from Microsoft Corporation of Redmond, Wash. Mailbox server 110 hosts one or more databases that include one or more user mailboxes. Depending on the size of the server-based email system in which mailbox server 110 is used, the number of user mailboxes included on mailbox server 110 may range from the hundreds, to the thousands and more. Large email systems may include hundreds or thousands of mailbox servers. An example mailbox server 110 is Microsoft Exchange Server 2007.

Mailbox archive storage 112 includes one or more storage devices that receive and store messages transferred from mailbox server 110 during an archiving operation. In one example, the mailbox archive storage 112 provides an archive mailbox for each user. Mailbox archive storage 112 can include server computers, disk storage systems, tape libraries, etc. The mailbox archive storage 112 is typically tightly packed and provides more archive mailboxes than mailbox server 110. Mailbox archive storage is also typically slower and more cost-effective than the cost of mailbox server 110. For example, hard disk drives for server computers used in mailbox storage 112 may be slower and less expensive than hard disk drives used for mailbox server 110 due to the expectation that users will access mailbox archive storage 112 less frequently than mailbox server 110. The mailbox archive storage 112 provides a cost efficient solution for archiving email messages from mailbox server 110.

Network 106 provides connectivity between client computers 102, 104, directory service 108, mailbox server 110 and mailbox archive storage 112. Network 106 is typically a corporate Intranet, the Internet or a combination of the two.

Figure 2:
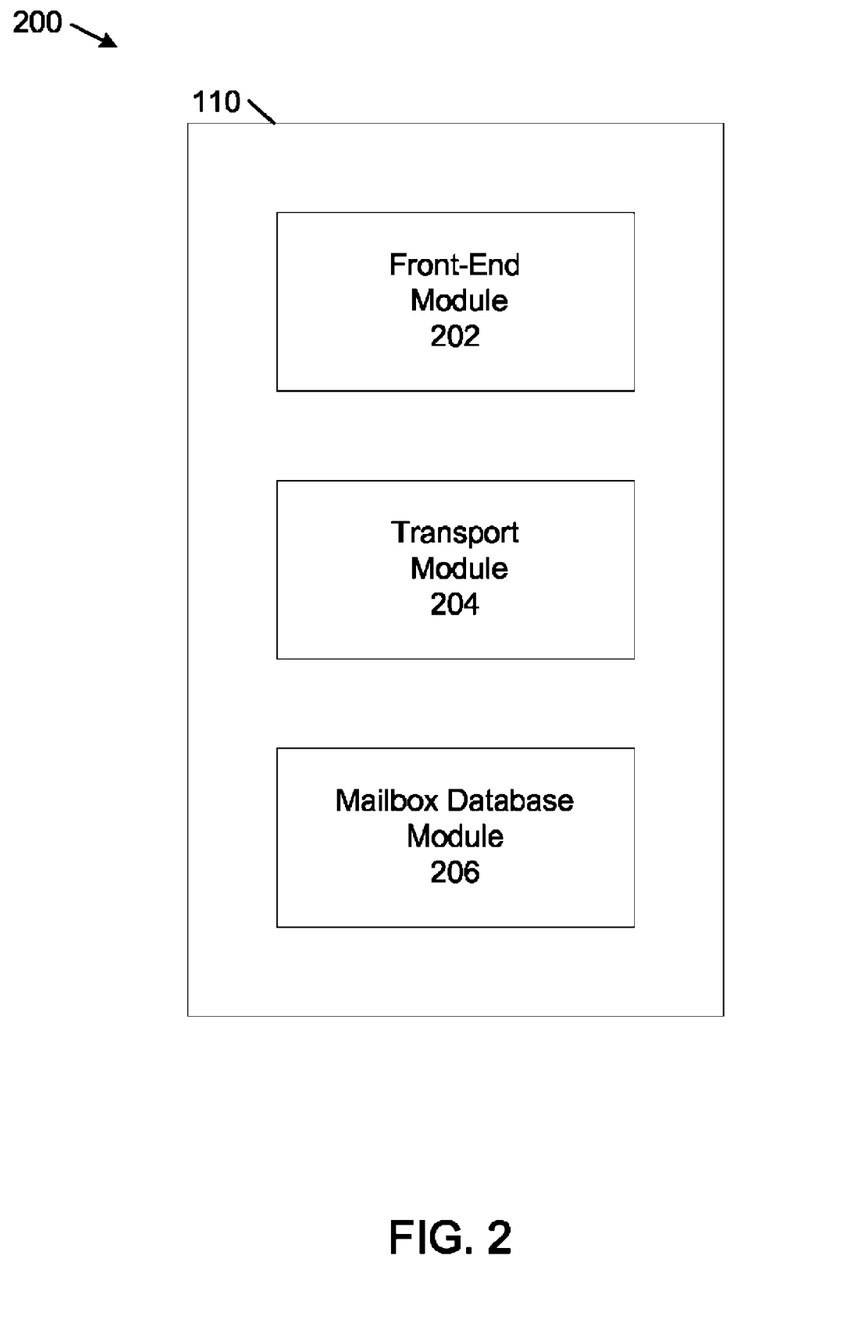
FIG. 2 shows example modules of the mailbox server of FIG. 1.

FIG. 2 shows example modules 200 of mailbox server 110. The example modules 200 of mailbox server 110 include a front-end module 202, a transport module 204 and a mailbox database module 206. The example front-end module 202 provides a connection interface for client computers 102, 104. Client computers 102, 104 typically connect to front-end module 202 using client side applications such as Microsoft Outlook® or Microsoft Outlook® Web App.

The example transport module 204 processes email messages in transit. As used in this disclosure, email messages in transit are email messages that have been received at mailbox server 110 via the front-end module 202 but have not yet been copied to a user mailbox. The example transport module 204 uses the directory service 108 to determine the specific user mailbox to which a received email message is to be directed. The example transport module 204 holds the received email message until the example transport module 204 determines that the received email message can be delivered to a user mailbox.

The example mailbox database module 206 comprises one or more databases that each includes one or more user mailboxes. Each user mailbox includes a mailbox table that contains a set of properties for the user mailbox. The properties represent metadata for the user mailbox. One example property indicates the current size of the user mailbox. Another example property indicates a storage quota for the user mailbox. The storage quota specifies the maximum allowable size for the user mailbox. Additional properties include a first threshold value and a second threshold value. The first threshold value specifies a percent of the storage quota which will trigger an archiving of emails in the user mailbox.

For example, if the first threshold is set to 90%, archiving is triggered when the current size of the user mailbox is 90% of the storage quota. The second threshold value specifies a percent of the storage quota that represents the extent to which the user mailbox is archived. For example, if the second threshold is 80%, when archiving occurs the email messages in the user mailbox are archived until the current size of the user mailbox is reduced to 80% of the storage quota.

In examples, especially for large email systems, the front-end module 202, the transport module 204 and the mailbox database module 206 may each reside on one or more separate server computers. For example, an email system may include one or more front-end server computers, one or more transport server computers and one or more mailbox database server computers.

Additionally, when the front-end module 202, transport module 204 and mailbox database module 206 all reside on one mailbox server, for example on mailbox server 110, some of the functionality discussed for these modules may be performed on other modules. For example, some of the functionality provided by the transport module 204, for example mailbox table property lookups, may be provided by mailbox database module 206.

The parameters associated with the archiving of email messages on the example mailbox server 110 can be controlled by a system administrator for the mailbox server 110. For example, the system administrator controls the property settings for storage quota and first and second threshold for each user mailbox. The system administrator also sets policy rules that determine which email messages are to be archived. The policy rules make use of metadata for each user mailbox. The metadata may include a time and date stamp for each email message, a priority property for each email message, the date and time that each email message was last accessed and a mailbox folder in which each email message is stored. Other examples of metadata for each user mailbox are possible.

For example, the system administrator may configure mailbox server 110 such that the oldest email messages are archived first. Alternatively, the system administrator may configure mailbox server 110 such that messages designated as low priority are archived first or that messages stored in certain mailbox folders (e.g., "Deleted Items") are archived first. Other examples for determining which emails are archived first are possible.

When a system administrator configures mailbox server 110 for a certain policy for archiving email messages, the policy applies to all user mailboxes associated with that mailbox server 110. The system administrator may also configure individual user mailboxes. However, in examples a user on a client computer, for example on client computer 102, 104, can override the configured policy. For example, a user on client computer 102 can configure an email client, for example Microsoft Outlook® on client computer 102, to archive email messages based on a priority of an email message. When a user on client computer 102 configures the email client on client computer 102 to archive email messages for the user based on the an email message priority, the configuration for the user mailbox is sent to mailbox server 110 and overrides the email archiving policy on mailbox server 110 for the user mailbox. However, a client computer cannot override the storage quota, first threshold and second threshold for a user mailbox set by the system administrator.

The email archiving mechanism in the present disclosure is a push-based policy. A push-based policy as used in the present disclosure is one in which a decision on whether to archive is made in real time when each email message is received at the mailbox server 110. The decision involves making a determination as to whether the size of the received email message plus the size of all attachments to the received email message plus the current size of a user mailbox to which the received email is directed is less than the first threshold value. With a push-based policy, the received email message is not sent to a user mailbox until this decision is made.

With a push-based policy, when it is determined that the size of a received email message plus all attachments to the email message plus the current size of a user mailbox are greater than a size equal to the first threshold multiplied by the storage quota for the user mailbox, an archiving operation is initiated. As a result of the archiving operation, enough email messages are archived from the user mailbox so that the received email message plus all attachments can be stored in the user mailbox. The implementation of a push-based policy ensures that all received email messages will be stored in the user mailbox and that received email messages are not rejected because of space limitations for the user mailbox.

Figure 3:
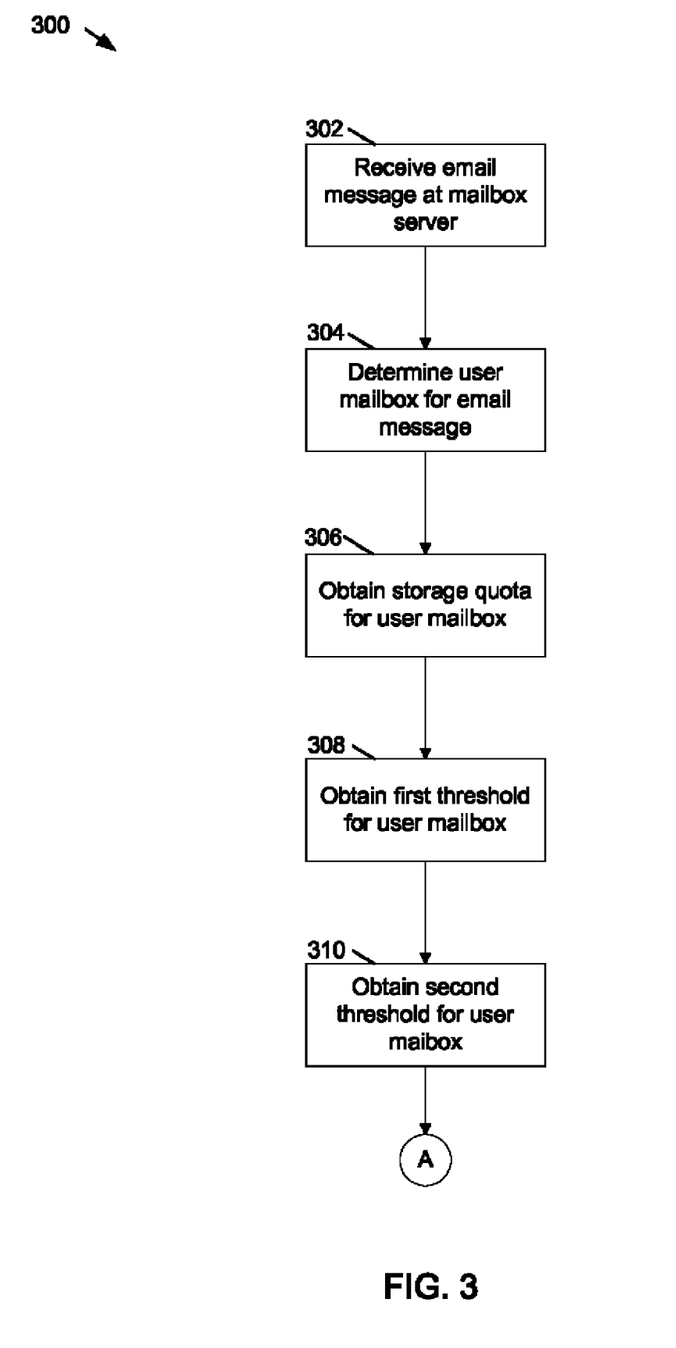
FIGS. 3 and 4 show a flowchart of a method for implementing quota-based archiving.
Figure 4:
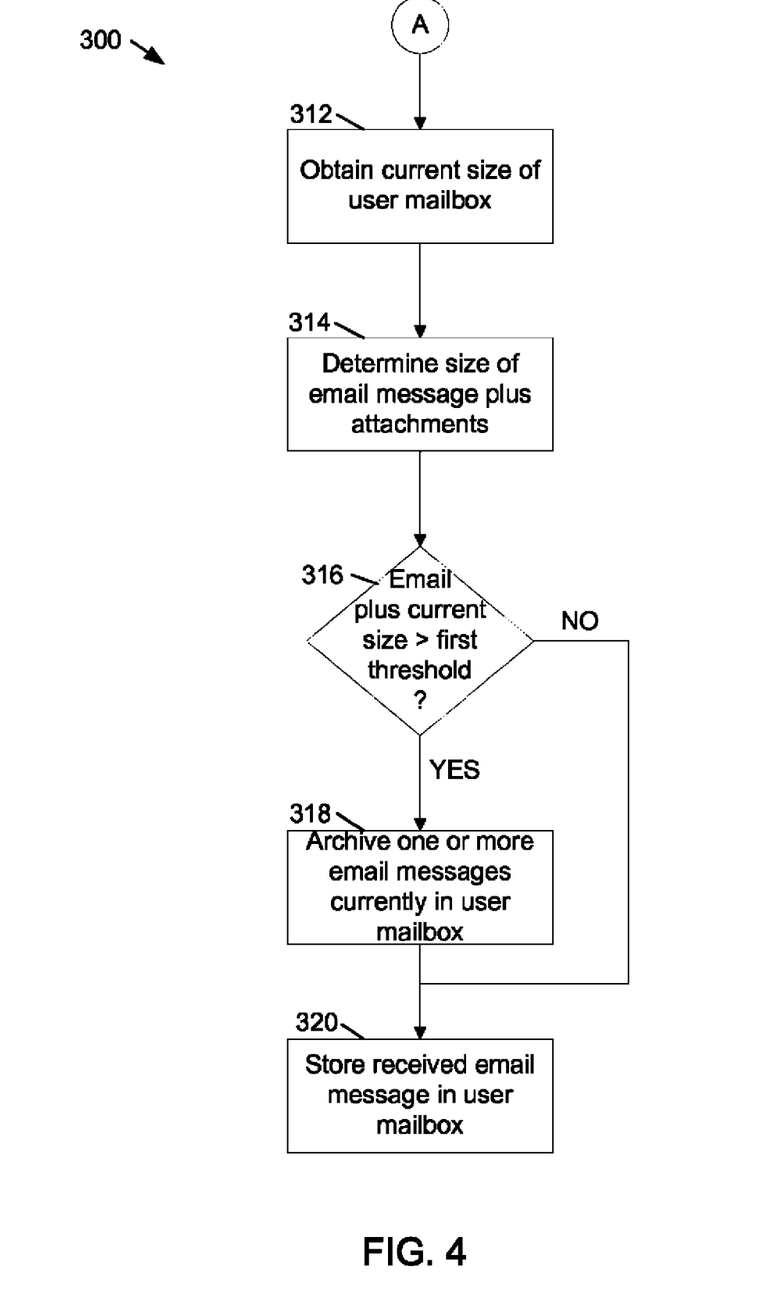

FIGS. 3 and 4 show an example flowchart of a method 300 for implementing quota-based archiving. At operation 302, an email message is received at mailbox server 110. At operation 304, a user mailbox is determined to receive the email message. The determination of the user mailbox is typically made by directory service 108, for example Active Directory. The directory service 108 determines the user mailbox based on an SMTP address in the email message. The directory service 108 maps the SMTP address to a user and determines the user mailbox associated with the user.

At operation 306, a storage quota is obtained for the user mailbox. The storage quota is typically obtained from a mailbox table associated with the user mailbox. The mailbox table is included in a database for the user mailbox on mailbox server 110.

At operation 308, a first threshold is obtained for the user mailbox and at operation 310, a second threshold is obtained for the user mailbox. The first threshold and the second threshold are also obtained from the mailbox table associated with the user mailbox. The first threshold represents a size threshold in bytes, for example a first percentage of the storage quota, which triggers archiving of the user mailbox. The second threshold represents another size threshold in bytes, for example a second percentage of the storage quota, to which the current size of the user mailbox is lowered as a result of archiving.

At operation 312, the current size of the user mailbox is obtained. The current size of the user mailbox is typically obtained from the mailbox table associated with the user mailbox. At operation 314, a determination is made as to the size of the received email message plus the size of all attachments to the email message. At operation 316, a determination is made as to whether the size of the received email message plus the size of all attachments to the email message, plus the current size of the user mailbox is greater than the first threshold.

When it is determined at operation 316 that the size of the received email message plus the size of all attachments to the email message, plus the current size of the user mailbox is greater than the first threshold, at operation 318 an archiving operation is started and one or more email messages are archived at mailbox server 110. The archiving operation removes the one or more email messages, plus all attachments to the email message, from mailbox server 110 and copies the one or more email messages plus attachments to mailbox archive storage 112. A determination of which email messages are archived is made based on an archiving policy set by a system administrator. As a default, older email messages are archived first. As discussed, the specific archive policy can be overwritten by a user at client computers 102, 104. Archiving continues until the current size of the user mailbox is less than the second threshold.

At operation 320, when the current size of the user mailbox becomes less than the second threshold, the received email message is copied to the user mailbox.

When it is determined at operation 316 that the size of the received email message plus the size of all attachments to the received email message plus the current size of the user mailbox is less than or equal to the first threshold, archiving is not initiated. Instead, control passes directly to operation 320 and the received email message is copied to the user mailbox.

Figure 5:
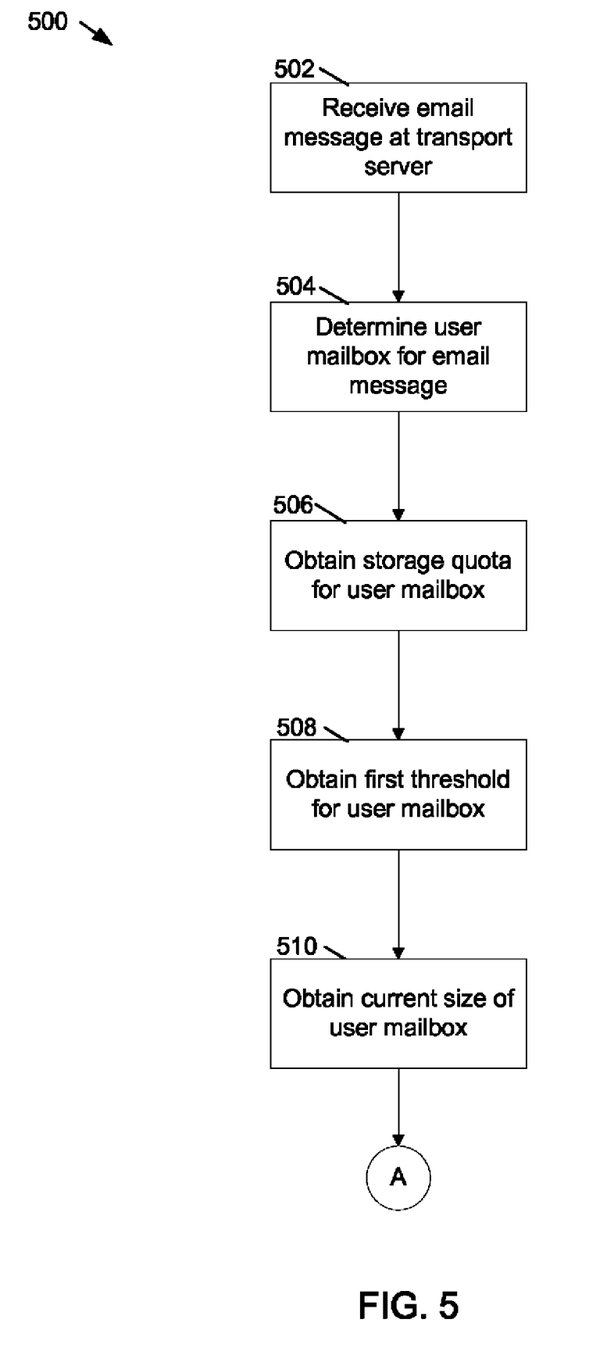
FIGS. 5 and 6 show a flowchart of another method for implementing quota-based archiving.
Figure 6:
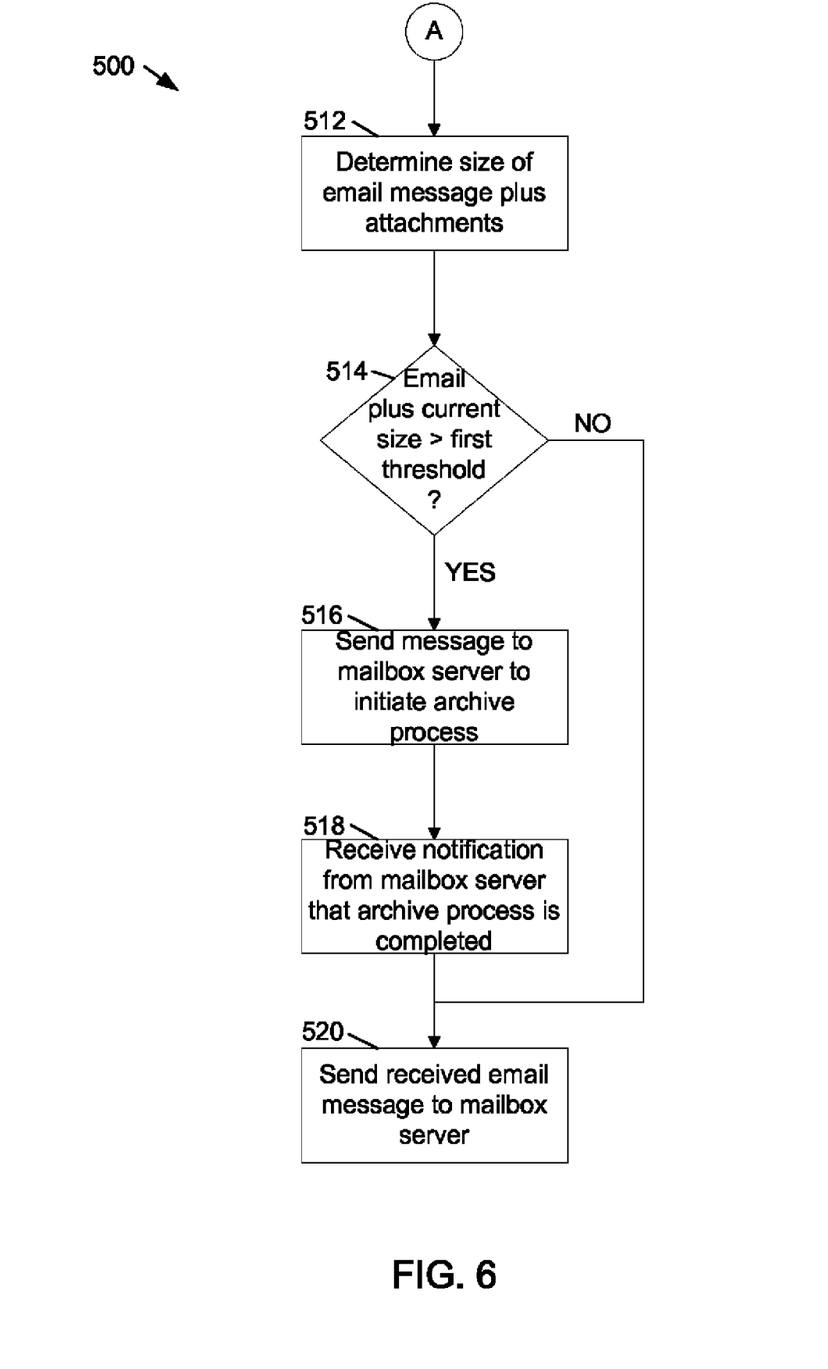

FIGS. 5 and 6 show an example flowchart of another method 500 for implementing quota-based archiving. The example method 500 is used in an email system that comprises at least one front-end server computer, at least one transport server computer and at least one mailbox database server computer. The front-end server computer generally incorporates the functionality of the example front-end module 204. The transport server computer generally incorporates the functionality of the example transport module 204. The mailbox database server computer generally incorporates the functionality of the example mailbox database module 206.

When separate servers are used, the functionality for obtaining the mailbox quota size, the current mailbox size and the first and second thresholds is on the transport server. In examples, the transport server obtains the mailbox quota size, the current mailbox size and the first and second thresholds via HTTP messaging via RPC calls to an application program interface on a mailbox database server. The first and second thresholds may also be obtained from directory service 108. In addition, when separate servers are used, the functionality for determining whether the size of the received mail message plus attachments plus the current size of the user mailbox is less than the first threshold is also on the transport server.

At operation 502, an email message is received at a transport server computer. The email message is sent to the transport server computer from a front-end server computer. At operation 504, a user mailbox is determined to receive the email message. The determination of the user mailbox is typically made by directory service 108, for example Active Directory. The directory service 108 determines the user address based on an SMTP address in the email message. The directory service 108 maps the SMTP address to a user and determines the user mailbox associated with the user.

At operation 506, a storage quota is obtained for the user mailbox. The storage quota is typically obtained from a mailbox table associated with the user mailbox. The mailbox table located in a mailbox server computer that includes the user mailbox.

At operation 508, a first threshold is obtained for the user mailbox. The first threshold is also obtained from the mailbox table associated with the user mailbox. The first threshold represents a size threshold in bytes, for example a first percentage of the storage quota, which triggers archiving of the user mailbox.

At operation 510, the current size of the user mailbox is obtained. The current size of the user mailbox is typically obtained from the mailbox table associated with the user mailbox. At operation 512, a determination is made as to the size of the received email message plus the size of all attachments to the email message. At operation 514, a determination is made as to whether the size of the received email message plus the size of all attachments to the email message, plus the current size of the user mailbox is less than the number of bytes corresponding to the first threshold.

When it is determined at operation 514 that the size of the received email message plus the size of all attachments to the email message, plus the current size of the user mailbox is greater than the first threshold, at operation 516 a message is sent to a mailbox database server to initiate an archiving process for the user mailbox on the mailbox database server. The mailbox database server includes functionality similar to that disclosed for mailbox database module 206.

At operation 518, notification is received the mailbox database server that the archive process is completed for the user mailbox. The notification informs the transport server that there is storage space in the user mailbox on the mailbox server for the received email message and all attachments to the received email message. At operation 520, the received email message is sent to the mailbox database server.

When it is determined at operation 514 that the size of the received email message plus the size of all attachments to the received email message plus the current size of the user mailbox is less than the first threshold, archiving is not initiated. Instead, control passes directly to operation 520 and the received email message is sent to the mailbox database server.

In other examples, not shown in FIG. 3, 4, 5 or 6, quota-based archiving may be turned off as a default. Turning quota-based archiving off may improve system efficiency, eliminating the need to check the size of each received email plus attachments. In examples, when quota-based archiving is turned off and a certain mailbox threshold is reached, for example a third threshold, a dialog box is displayed to inform a system administrator to turn quota-based archiving on. When quota-based archiving is turned on the size of each received email message is checked, as discussed, to determine whether an archiving operation is to be initiated.

Figure 7:
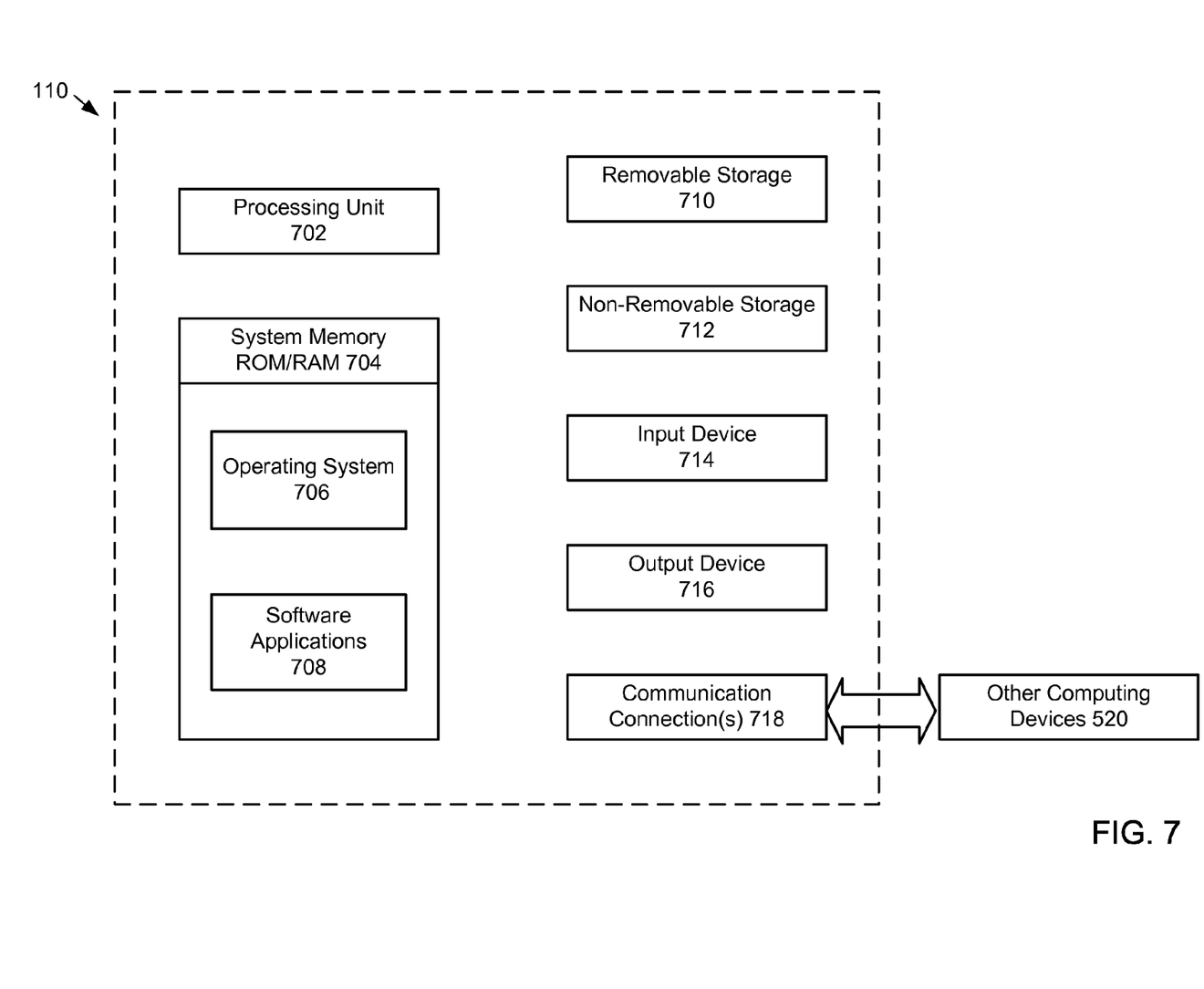
FIG. 7 shows example components of the mailbox server of FIG. 1.

With reference to FIG. 7, example components of mailbox server 110 are shown. In example embodiments, the mailbox server 110 is a computing device. The mailbox server 110 can include input/output devices, a central processing unit ("CPU"), a data storage device, and a network device. Client computers 102, 104 can be configured in a similar manner.

In a basic configuration, the mailbox server 110 typically includes at least one processing unit 702 and system memory 704. Depending on the exact configuration and type of computing device, the system memory 704 may be volatile (such as RAM), non-volatile (such as ROM, flash memory, etc.) or some combination of the two. System memory 704 typically includes an operating system 706 suitable for controlling the operation of a networked personal computer, such as the Windows® operating systems from Microsoft Corporation of Redmond, Wash. or a server, such as Microsoft Exchange Server 2007, also from Microsoft Corporation of Redmond, Wash. The system memory 704 may also include one or more software applications 708 and may include program data.

The mailbox server 110 may have additional features or functionality. For example, the mailbox server 110 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 7 by removable storage 710 and non-removable storage 712. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mailbox server 110. Any such computer readable storage media may be part of device 110. Mailbox server 110 may also have input device(s) 714 such as keyboard, mouse, pen, voice input device, touch input device, etc. Output device(s) 716 such as a display, speakers, printer, etc. may also be included.

The mailbox server 110 may also contain communication connections 718 that allow the device to communicate with other computing devices 720, such as over a network in a distributed computing environment, for example, an intranet or the Internet. Communication connection 718 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method for archiving email messages on a server computer, the method comprising:
   receiving an email message at the server computer;
   determining a user mailbox to which the email message is to be directed;
   obtaining a storage quota for the user mailbox;
   obtaining a first threshold for the user mailbox, the first threshold being a first percentage of the storage quota;
   obtaining a second threshold for the user mailbox, the second threshold being a second percentage of the storage quota, the second threshold being lower than the first threshold;
   obtaining a current size of the user mailbox, the current size comprising the size in bytes of all email messages and attachments to email messages currently in the user mailbox;
   determining a size of the received email message;
   determining whether the size of the received email message plus the current size of the user mailbox exceeds the first threshold for the user mailbox;
   when it is determined that the size of the received email message plus the current size of the user mailbox exceeds the first threshold for the user mailbox, archiving one or more email messages in the user mailbox, the archiving of the one or more email messages reducing the current size of the user mailbox such that the current size of the user mailbox becomes less than the number of bytes corresponding to the second threshold for the user mailbox; and
   when it is determined that the size of the received email message plus the size of all attachments to the received email message plus the current size of the user mailbox exceeds the first threshold for the user mailbox, copying the received email message to the user mailbox when the current size of the user mailbox becomes less than the number of bytes corresponding to the second threshold for the user mailbox,
   wherein a determination of whether to archive one or more email messages in the user mailbox is made each time an email message is received at the server computer.

2. The method of claim 1, wherein the received email message is not delivered to the user mailbox until the determination is made as to whether the size of the received email message plus the current size of the user mailbox exceeds the first threshold for the user mailbox.

3. The method of claim 1, wherein the storage quota, the current size of the user mailbox, the first threshold and the second threshold comprise metadata associated with the user mailbox.

4. The method of claim 3, wherein the storage quota, the current size of the user mailbox, the first threshold and the second threshold are obtained from a mailbox table on the server computer.

5. The method of claim 1, wherein archiving the one or more email messages comprises storing the one or more email messages on one or more storage devices external to the server computer.

6. The method of claim 5, further comprising deleting the one or more email messages from the server computer after the one or more email messages are stored on the one or more storage devices.

7. The method of claim 1, wherein the one or more email messages to be archived are selected based on rules set by an administrator of the server computer.

8. The method of claim 7, wherein the rules set by the administrator are modified by instructions received from a client computer.

9. The method of claim 1, wherein the one or more email messages to be archived are selected based on metadata associated with the user mailbox.

10. The method of claim 1, wherein the one or more email messages to be archived are determined by a date and time that the one or more email messages were received in the user mailbox, the oldest email messages being archived first.

11. The method of claim 1, wherein the one or more email messages are archived based on a priority of email messages in the user mailbox, email messages having the lowest priority being archived first.

12. The method of claim 1, wherein the one or more email messages are archived based on a date and time that the one or more email messages were last accessed, the least recently accessed mail messages being archived first.

13. The method of claim 1, wherein the one or more email messages are archived based on one or more folders that store the one or more email messages, the user mailbox including rules specifying a priority of folders from which stored email messages are to be archived.

14. A method for archiving email messages on a first server computer, the method comprising:
receiving an email message at the first server computer;
determining a user mailbox to which the email message is to be directed;
obtaining a storage quota for the user mailbox;
obtaining a first threshold for the user mailbox, the first threshold being a first percentage of the storage quota;
obtaining a second threshold for the user mailbox, the second threshold being a second percentage of the storage quota, the second threshold being lower than the first threshold;
obtaining a current size of the user mailbox, the current size being the size in bytes of all email messages and attachments to email messages currently in the user mailbox;
determining the size of the email message plus the size of all attachments to the email message;
determining whether the size of the email message plus the size of all attachments to the email message plus the current size exceeds the first threshold for the user mailbox;
when it is determined that the size of the email message plus the size of all attachments to the email message plus the current size exceeds the first threshold for the user mailbox, archive one or more email messages in the user mailbox, the archiving of the one or more email messages reducing the current size of the user mailbox such that the current size becomes less than the second threshold for the user mailbox, wherein the one or more email messages to be archived are selected based on rules set by an administrator of the server computer or a priority of the one or more email messages;
when it is determined that the size of the email message plus the size of all attachments to the email message plus the current size exceeds the first threshold for the user mailbox, sending a message to a second server computer to initiate an archive process for the user mailbox;
receiving a notification from the second server computer that the archive process is completed; and after receiving a notification from the second server computer that the archive process is completed, sending the received email message to the second server computer.

15. The method of claim 14, wherein the storage quota, the first threshold and the current size are obtained from the second server computer.

16. The method of claim 14, wherein determining a user mailbox to which the email message is to be directed further comprises using a directory service to obtain the user mailbox.

17. A computer-readable data storage device comprising instructions that, when executed by a processing unit of a server computer, cause the processing unit to:
receive an email message at the server computer;
determine the size of the email message plus the size of all attachments to the email message;
determine a user mailbox to which the email message is to be directed;
obtain a storage quota for the user mailbox;
obtain a first threshold for the user mailbox, the first threshold being a first percentage of the storage quota;
obtain a second threshold for the user mailbox, the second threshold being a second percentage of the storage quota, the second threshold being lower than the first threshold;
obtain a current size of the user mailbox, the current size being the size in bytes of all email messages and attachments to email messages currently in the user mailbox;
determine whether the size of the email message plus the size of all attachments to the email message plus the current size exceeds the first threshold for the user mailbox;
when it is determined that the size of the email message plus the size of all attachments to the email message plus the current size exceeds the first threshold for the user mailbox, archive one or more email messages in the user mailbox, the archiving of the one or more email messages reducing the current size of the user mailbox such that the current size becomes less than the second threshold for the user mailbox, wherein the one or more email messages to be archived are selected based on rules set by an administrator of the server computer or a priority of the one or more email messages; and
when it is determined that the size of the email message plus the size of all attachments to the email message plus the current size exceeds the first threshold for the user mailbox, deliver the email message to the user mailbox when the current size of the user mailbox becomes less than the second threshold for the user mailbox,
wherein the storage quota, the first threshold and the second threshold are obtained from metadata for the user mailbox.

* * * * *